United States Patent
Vogan (10) Patent No.: US 10,552,077 B2
(45) Date of Patent: Feb. 4, 2020

(54) TECHNIQUES FOR MANAGING PARTITIONS ON A STORAGE DEVICE

(71) Applicant: Apple Inc., Cupertino, CA (US)

(72) Inventor: Andrew W. Vogan, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/721,285

(22) Filed: Sep. 29, 2017

(65) Prior Publication Data

US 2019/0102100 A1   Apr. 4, 2019

(51) Int. Cl.
*G06F 12/00* (2006.01)
*G06F 3/06* (2006.01)
*G06F 12/02* (2006.01)
*G06F 12/1009* (2016.01)

(52) U.S. Cl.
CPC .......... *G06F 3/0644* (2013.01); *G06F 3/0604* (2013.01); *G06F 3/0605* (2013.01); *G06F 3/0631* (2013.01); *G06F 3/0659* (2013.01); *G06F 3/0679* (2013.01); *G06F 12/0238* (2013.01); *G06F 12/0246* (2013.01); *G06F 12/0284* (2013.01); *G06F 12/0292* (2013.01); *G06F 12/1009* (2013.01)

(58) Field of Classification Search
CPC .... G06F 3/0644; G06F 3/0604; G06F 3/0659; G06F 3/0679; G06F 12/0238; G06F 12/0246; G06F 12/0284; G06F 12/0292; G06F 12/1009
See application file for complete search history.

(56) References Cited

U.S. PATENT DOCUMENTS

| | | | |
|---|---|---|---|
| 6,609,187 B1 * | 8/2003 | Merrell | G06F 3/0601 711/173 |
| 2013/0339572 A1 * | 12/2013 | Fanning | G06F 12/1009 711/102 |
| 2015/0378640 A1 | 12/2015 | Huang | |
| 2016/0070652 A1 | 3/2016 | Sundararaman et al. | |
| 2016/0117115 A1 * | 4/2016 | Mehra | G06F 3/0631 711/112 |
| 2016/0283124 A1 | 9/2016 | Hashimoto et al. | |

* cited by examiner

*Primary Examiner* — Shawn X Gu
(74) *Attorney, Agent, or Firm* — Dickinson Wright RLLP (57) ABSTRACT

Disclosed herein are techniques for managing partitions on a storage device. A method can include (1) identifying a storage capacity of the storage device, (2) generating a first data structure that defines a first partition on the storage device, where the first partition consumes a first amount of the storage capacity, and (3) generating a second data structure that defines a second partition on the storage device, where the second partition consumes at least a portion of a remaining amount of the storage capacity relative to the first amount. In response to receiving a shrink request directed to the first partition, the method can further include (4) identifying a first utilized area within the first partition that will no longer be utilized as a result of the shrink request, and (5) updating first information in the first data structure to indicate that the first utilized area is unutilized.

20 Claims, 10 Drawing Sheets

Example Step 1 – Example scenario / original sizes of partitions

Example Step 2 – Process a request to shrink Partition #0

Example Step 3 – Process a request to shrink Partition #1

Example Step 4 – Deny a request to expand Partition #0 to a size that exceeds its original size

FIG. 3B

Example Step 5 – Process a request to expand Partition #1 to a size that is less than its original size

Example Step 6 – State of partitions after Partition #1 is expanded

TECHNIQUES FOR MANAGING PARTITIONS ON A STORAGE DEVICE

FIELD

The described embodiments set forth techniques for managing partitions on a storage device (e.g., a solid-state drive (SSD)). In particular, and as described in greater detail herein, the techniques involve forming and organizing the partitions in a manner that enables the partitions to be resized in a streamlined manner by avoiding the need to relocate data within the partitions.

BACKGROUND

Solid state drives (SSDs) are a type of storage device that share a similar footprint with (and provide similar functionality as) traditional magnetic-based hard disk drives (HDDs). Notably, standard SSDs—which utilize "flash" memory—can provide various advantages over standard HDDs, such as considerably faster Input/Output (I/O) performance. For example, average I/O latency speeds provided by SSDs typically outperform those of HDDs because the I/O latency speeds of SSDs are less-affected when data is fragmented across the memory sectors of SSDs. This occurs because HDDs include a read head component that must be relocated each time data is read/written, which produces a latency bottleneck as the average contiguity of written data is reduced over time. Moreover, when fragmentation occurs within HDDs, it becomes necessary to perform resource-expensive defragmentation operations to improve or restore performance. In contrast, SSDs, which are not bridled by read head components, can preserve I/O performance even as data fragmentation levels increase. SSDs also provide the benefit of increased impact tolerance (as there are no moving parts), and, in general, virtually limitless form factor potential. These advantages—combined with the increased availability of SSDs at consumer-affordable prices—make SSDs a preferable choice for mobile devices such as laptops, tablets, and smart phones.

Under common use-cases, the storage space of a given SSD is typically separated into two partitions in order to provide a useful separation between different sets of data stored on the SSD. For example, a common approach for partitioning an SSD of a given consumer-based computing device involves establishing a first partition on the SSD for storing operating system (OS) data and user data, where the first partition is assigned to a majority of the available storage space on the SSD. Continuing with this example approach, a second partition can also be established on the SSD, where the second partition stores a recovery module (e.g., a recovery OS) and is assigned to a remainder of the available storage space (relative to the first partition) on the SSD. In this manner, users can remain capable of utilizing a large amount of storage space for storing their data, with the convenience of being able to reliably access a recovery module for restoring their computing devices when necessary (e.g., in response to failure events).

Notably, it can be common for users to want to separate the aforementioned first partitions into two or more partitions. For example, a user may seek to separate the first partition of a given SSD into two different partitions onto which two different operating systems can respectively be stored. In another example, the user may seek to separate the first partition of the SSD into two different partitions onto which different categories of data can be stored—e.g., OS and application files on one partition, and user files on another partition. Unfortunately, conventional techniques for carrying out such modifications—which can involve resizing existing partitions and creating new partitions—are time consuming and error-prone. Accordingly, there exists a need for an improved technique for modifying partition sizes on SSDs to provide enhanced flexibility to end-users.

SUMMARY

The described embodiments set forth techniques for managing partitions on a storage device (e.g., a solid-state drive (SSD)). In particular, the techniques involve establishing a maximum size for at least one partition, where the maximum size dictates boundaries within which the at least one partition can be resized. In this manner, when a size of the at least one partition is reduced, any data within the at least one partition—and not within an area of the storage device that is freed up by way of the reduction—does not need to be relocated within the at least one partition. Similarly, when the size of the at least one partition is increased within the boundaries of the maximum size, the data within the at least one partition does not need to be relocated. Therefore, the techniques set forth herein provide a streamlined approach for resizing partitions.

One embodiment sets forth a method for managing partitions on a storage device. According to some embodiments, the method can include the steps of (1) identifying a storage capacity of the storage device, (2) generating a first data structure that defines a first partition on the storage device, where the first partition consumes a first amount of the storage capacity, and (3) generating a second data structure that defines a second partition on the storage device, where the second partition consumes at least a portion of a remaining amount of the storage capacity relative to the first amount. Additionally, the method can further include the steps of (4) in response to receiving a shrink request directed to the first partition: (5) identifying a first utilized area within the first partition that will no longer be utilized as a result of the shrink request, and (6) updating first information in the first data structure to indicate that the first utilized area is unutilized.

Additionally, the method can be configured to handle requests for increasing the size of the first partition. In particular, the method can include the steps of (7) receiving an expansion request directed to the first partition, and (8) in response to determining that the expansion request will not cause the first partition to consume a second amount of storage capacity that exceeds the first amount: (9) identifying an unutilized area of the first partition that will transition into a second utilized area as a result of the expansion request, and (10) updating second information in the first data structure to indicate that the unutilized area is now utilized.

Additionally, the method can be configured to account for the dynamic partition sizes described herein when processing I/O requests. In particular, the method can include the steps of (11) receiving an input/output (I/O) request that references a particular logical base address (LBA) associated with the storage device, (12) in response to identifying that the I/O request is directed to the first partition: (i) processing the I/O request, and (ii) returning at least one first result associated with the I/O request. Additionally, the method can include the steps of (13) in response to identifying that the I/O request is directed to the second partition: (i) updating the particular LBA in accordance with the first amount of the storage capacity, (ii) processing the I/O request, and (iii) returning at least one second result associated with the I/O request.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The embodiments disclosed herein set forth techniques for managing partitions on a storage device. In particular, the techniques enable the partitions to be resized in an efficient manner when certain resize requirements are met. For example, consider a scenario in which two different partitions are established on a storage device, where (1) a first data structure defines the first partition on the storage device, and (2) a second data structure defines the second partition on the storage device. In turn, when a request to shrink one of the partitions—e.g., the first partition—is received, the techniques can include (1) identifying a first utilized area within the first partition that will no longer be utilized as a result of the shrink request, and (2) updating first information in the first data structure to indicate that the first utilized area is unutilized. As described in greater detail herein, this approach is efficient as it is unnecessary to relocate any of the data on the storage device that is stored outside of the first utilized area (as this data remains unaffected the by the resizing of the first partition). Moreover, and as described in greater detail herein, the first data structure can implement hierarchies and encoding schemes that enable the unutilized area to be represented in an efficient manner.

Additionally, the techniques can further enable the partitions to be expanded in accordance with the resize requirements described herein. For example, when an expansion request is directed to a particular partition—e.g., the first partition—the expansion request can be processed under a condition that the expansion of the first partition does not exceed the original size of the first partition (e.g., when it was initially formed). For example, the techniques can involve (1) receiving an expansion request directed to the first partition, and (2) in response to determining that the expansion request will not cause the first partition to consume an updated amount of storage capacity that exceeds the original amount: (3) identifying an unutilized area of the first partition that will transition into a second utilized area as a result of the expansion request, and (4) updating information in the first data structure to indicate that the unutilized area is now utilized. Again, and as described in greater detail herein, the first data structure can implement hierarchies and encoding schemes that enable the newly-utilized area to be represented in an efficient manner.

Additionally, the techniques set forth herein can be configured to account for the dynamic partition sizes when processing input/output (I/O) requests. For example, an I/O request can reference a particular logical base address (LBA) associated with the storage device. In turn, the techniques can involve processing the I/O request in accordance with an identified partition to which the I/O request—in particular, the LBA—corresponds. For example, when the LBA corresponds to the first partition—which is not offset relative to any other partition—the techniques can involve (i) processing the I/O request, and (ii) returning at least one first result associated with the I/O request. In other words, the LBA referenced in the I/O request does not need to be adjusted, as the first partition is not offset relative to any other partition. Alternatively, when the LBA corresponds to the second partition—which is offset relative to the first partition by the original size of the first partition—the techniques can involve (i) updating the particular LBA in accordance with the original size of the first partition, (ii) processing the I/O request, and (iii) returning at least one second result associated with the I/O request.

A more detailed discussion of these techniques is set forth below and described in conjunction with FIGS. 1, 2, 3A-3D, 4A-C, and 5, which illustrate detailed diagrams of systems and methods that can be used to implement these techniques.

Figure 1:
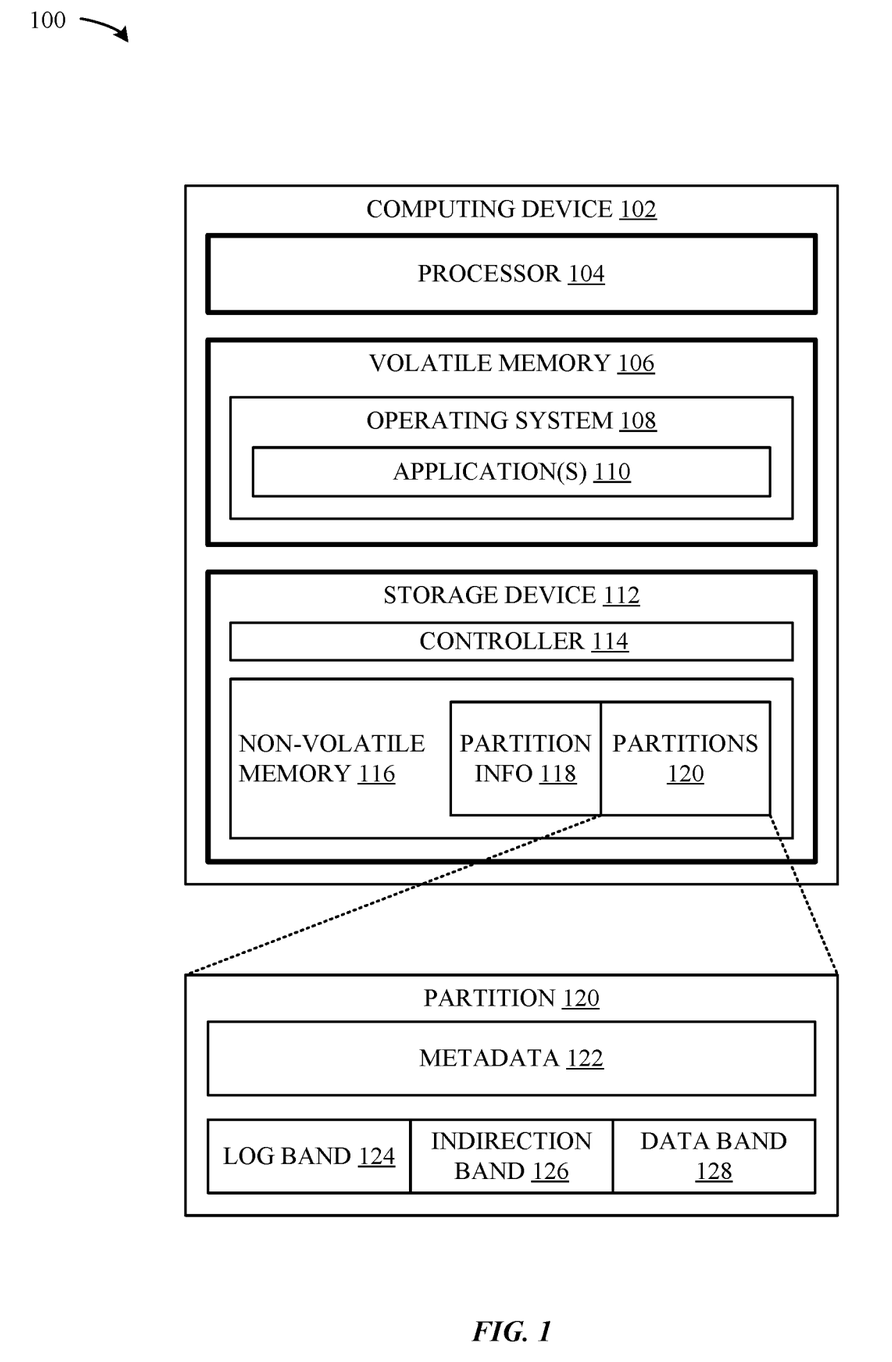
FIG. 1 illustrates a block diagram of different components of a system that is configured to implement the various techniques described herein, according to some embodiments.

FIG. 1 illustrates a block diagram 100 of a computing device 102—e.g., a smart phone, a tablet, a laptop, a desktop, a server, etc.—that is configured implement the various techniques described herein. As shown in FIG. 1, the computing device 102 can include a processor 104 that, in conjunction with a volatile memory 106 (e.g., a dynamic random access memory (DRAM)) and a storage device 112 (e.g., a solid-state drive (SSD)), enables different software entities to execute on the computing device 102. For example, the processor 104 can be configured to load, from the storage device 112 into the volatile memory 106, various components for an operating system (OS) 108. In turn, the OS 108 can enable the computing device 102 to provide a variety of useful functions, e.g., loading/executing various applications 110 (e.g., user applications). It should be understood that the various hardware components of the computing device 102 illustrated in FIG. 1 are presented at a high level in the interest of simplification, and that a more detailed breakdown is provided below in conjunction with FIG. 5.

According to some embodiments, and as shown in FIG. 1, the storage device 112 can include a controller 114 that is configured to orchestrate the overall operation of the storage device 112. For example, the controller 114 can be configured to process input/output (I/O) requests—also referred to herein as "transactions"—issued by the OS 108/applications 110 to the storage device 112. According to some embodiments, the controller 114 can include a parity engine for establishing various parity information for the data stored by the storage device 112 to improve overall recovery scenarios. It is noted that the controller 114 can include additional entities that enable the implementation of the various techniques described herein without departing from the scope of this disclosure. Is further noted that these entities can be combined or split into additional entities without departing from the scope of this disclosure. It is additionally noted that the various entities described herein can be implemented using software-based or hardware-based approaches without departing from the scope of this disclosure.

In any case, as shown in FIG. 1, the storage device 112 can include a non-volatile memory 116 (e.g., flash memory) on which different partitions 120 can be established. According to some embodiments, partition information 118 can provide various information about the partitions 120, e.g., a number of the partitions 120, sizes for each of the partitions 120, and so on. Moreover, the partition information 118 can indicate a primary one of the partitions 120 that should be accessed by the computing device 102 when carrying out boot procedures. For example, if the files associated with the OS 108 are stored on a first partition 120, and the files associated with a recovery OS are stored on a second partition 120, then the partition information 118 can indicate that the first partition 120 should be accessed by the computing device 102 when carrying out regular boot procedures. In this manner, the partition information 118 can also be utilized to indicate that the second partition 120 should be accessed by the computing device 102 when carrying out recovery boot procedures.

In any case, as shown in FIG. 1, each partition 120 can include metadata 122 that identifies various properties associated with the partition 120. For example, the metadata 122 can include, for a given partition 120, an index, a name, a size, and so on. Moreover, the metadata 122 can provide the locations of different groups of information—referred to herein as "bands"—that are stored within the partition 120. According to some embodiments, the non-volatile memory 116 can be composed of different dies, where the different bands span one or more of the dies. It is noted that one or more of the dies can be reserved by the storage device 112—e.g., for overprovisioning-based techniques—without departing from the scope of this disclosure, such that a given band can span a subset of the dies that are available within the non-volatile memory 116. In this regard, the overall "width" of a band can be defined by the number of dies that the band spans. Continuing with this notion, the overall "height" of the band can be defined by a number of "stripes" into which the band is separated. Additionally, and according to some embodiments, each stripe within the band can be separated into a collection of pages, where each page is disposed on a different die of the non-volatile memory 116. For example, when a given band spans five different dies—and is composed of five different stripes—a total of twenty-five (25) pages are included in the band, where each column of pages is disposed on the same die. In this manner, the data within a given band can be separated across the non-volatile memory 116 in a manner that enables redundancy-based protection to be established without significantly impacting the overall performance of the storage device 112.

In any case, as shown in FIG. 1, each partition 120 can include a log band 124, an indirection band 126, and a data band 128. According to some embodiments, transactional information associated with the indirection band 126/data band 128—e.g., details associated with I/O requests processed by the controller 114—can be written into the log band 124. According to some embodiments, the transactional information can include pointers to context information stored within the indirection band 126. In particular, these pointers can enable a restoration of the context information to be carried out in response to inadvertent shutdowns of the computing device 102. According to some embodiments, different log files can be managed within the log band 124, and can be used to store transactional information associated with the transactions as they are processed. Moreover, redundant copies of log file portions can be stored within the log band 124, thereby improving the efficacy of recovery procedures even when severe failure events take place.

According to some embodiments, the content information stored in the indirection band 126 can serve as a mapping table for data that is stored within the data band 128. According to some embodiments, and as described in greater detail herein, the context information can be organized into a hierarchical structure that is limited to first and second depth levels. In particular, the first depth level can correspond to a collection of first-tier entries, while the second depth level can correspond to a collection of second-tier entries. A more detailed description of the first-tier entries and second-tier entries is provided below in conjunction with FIG. 2.

Accordingly, FIG. 1 provides high-level overview of the manner in which the computing device 102 can be configured to implement the techniques described herein. A more detailed explanation of these techniques will now be provided below in conjunction with FIGS. 2, 3A-3D, 4A-4C, and 5.

Figure 2:
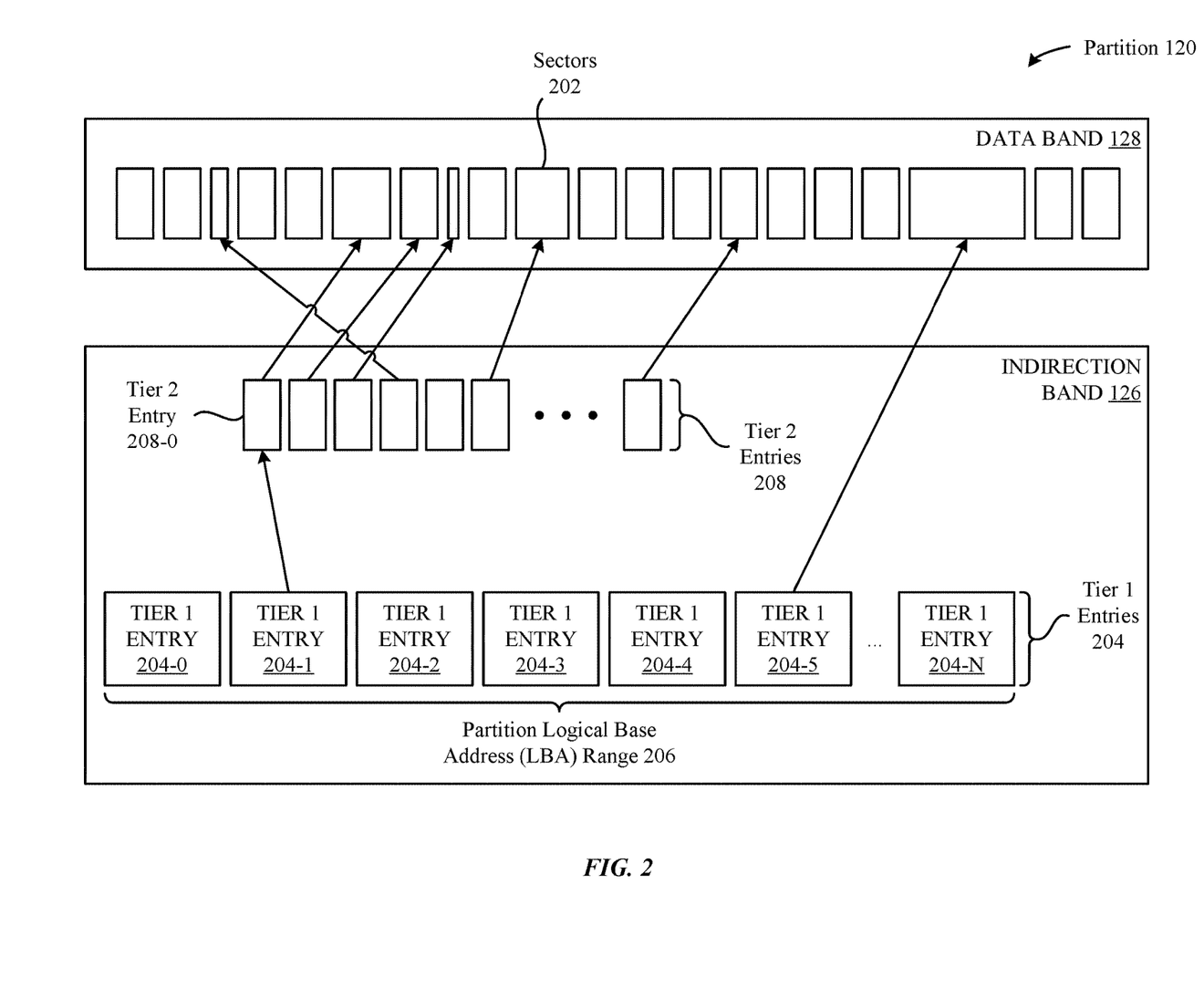
FIG. 2 illustrates a conceptual diagram of an example scenario that sets forth the manner in which an indirection band of a given partition can be used to reference data stored within the data band of the partition, according to some embodiments.

FIG. 2 illustrates a conceptual diagram of an example scenario that sets forth the manner in which an indirection band 126 of a given partition 120 can be used to reference data stored within the data band 128 of the partition 120, according to some embodiments. As shown in FIG. 2, the indirection band 126 can include a collection of Tier 1 entries 204 (i.e., first-tier entries) and a collection of Tier 2 entries 208 (i.e., second-tier entries). According to some embodiments, each Tier 1 entry 204 can span a subset of logical base addresses (LBAs) 206 that correspond to the partition 120, where different encoding schemes can be used to reference the Tier 1 entries 204 and the Tier 2 entries 208. In particular, the Tier 1 entries 204 and the Tier 2 entries 208 can store data in accordance with different encoding formats that coincide with the manner in which the non-volatile memory 116 is partitioned into different sectors 202. For example, when each sector 202 represents a 4 KB block of the non-volatile memory 116, each Tier 1 entry 204 entry can correspond to a contiguous collection of two hundred fifty-six (256) sectors 202. In this regard, the value of a given Tier 1 entry 204 can indicate whether the Tier 1 entry 204 (1) directly refers to a physical location (e.g., an address of a starting sector 202) within the non-volatile memory 116, or (2) directly refers (e.g., via a pointer) to one or more Tier 2 entries 208 that enable sectors 202 to be referenced through only one level of indirection.

According to some embodiments, when a Tier 1 entry 204 directly refers to a physical location—e.g., a sector 202—within the non-volatile memory 116, it is implied that all (e.g., the two-hundred fifty-six (256)) sectors 202 associated with the Tier 1 entry 204 are contiguously written, thereby providing a compression ratio of 1/256. More specifically, this compression ratio can be achieved because the Tier 1 entry 204 simply stores a pointer to a first sector 202 of the two hundred fifty-six (256) sectors 202 associated with the Tier 1 entry 204, where no Tier 2 entries 208 are required. Alternatively, when the Tier 1 entry 204 instead refers to one or more Tier 2 entries 208, the information included in the Tier 1 entry 204 indicates (i) one or more Tier 2 entries 208 that are associated with the Tier 1 entry 204, as well as (ii) how the information in the one or more Tier 2 entries 208 should be interpreted. Using this approach, each Tier 2 entry 208 can refer to one or more of the sectors 202, thereby enabling data to be disparately stored across the sectors 202 of the non-volatile memory 116.

To provide further understanding of the above-described techniques, the example scenario illustrated in FIG. 2 involves at least one Tier 1 entry 204—in particular, the Tier 1 entry 204-5—that refers directly to a physical location (e.g., an address of a starting sector 202) within the non-volatile memory 116. According to this example, the Tier 1 entry 204-5 can represent a Tier 1 entry 204 that corresponds to a contiguous span of sectors 202 (as previously described herein). Alternatively, and as also illustrated in FIG. 2, the Tier 1 entry 204-1 references at least one of the Tier 2 entries 208—in particular, the Tier 2 entry 208-0. In this regard, the Tier 2 entry 208-0—along with any other Tier 2 entries 208 that correspond to the Tier 1 entry 204-5—establish an indirect reference between the Tier 1 entry 204-1 and at least one sector 202 of the non-volatile memory 116.

Accordingly, the indirection techniques described herein enable each LBA to refer to content stored in the non-volatile memory 116 through only one or two levels of hierarchy, thereby providing an efficient architecture on which the various techniques described herein can be implemented. It is noted that a more detailed breakdown of various indirection techniques that can be utilized by the embodiments set forth herein can be found in U.S. patent application Ser. No. 14/710,495, filed May 12, 2015, entitled "METHODS AND SYSTEM FOR MAINTAINING AN INDIRECTION SYSTEM FOR A MASS STORAGE DEVICE," the content of which is incorporated by reference herein in its entirety.

Accordingly, FIG. 2 sets forth the manner in which first and second tier entries associated with an indirection band 126 of a given partition 120 can be used to reference data stored within the data band 128 of the partition 120. In this regard, it is noted that the indirection techniques described herein can enable partitions 120 to be efficiently resized when particular conditions are met, which will now be described below in conjunction with FIGS. 3A-3D.

Figure 3A:
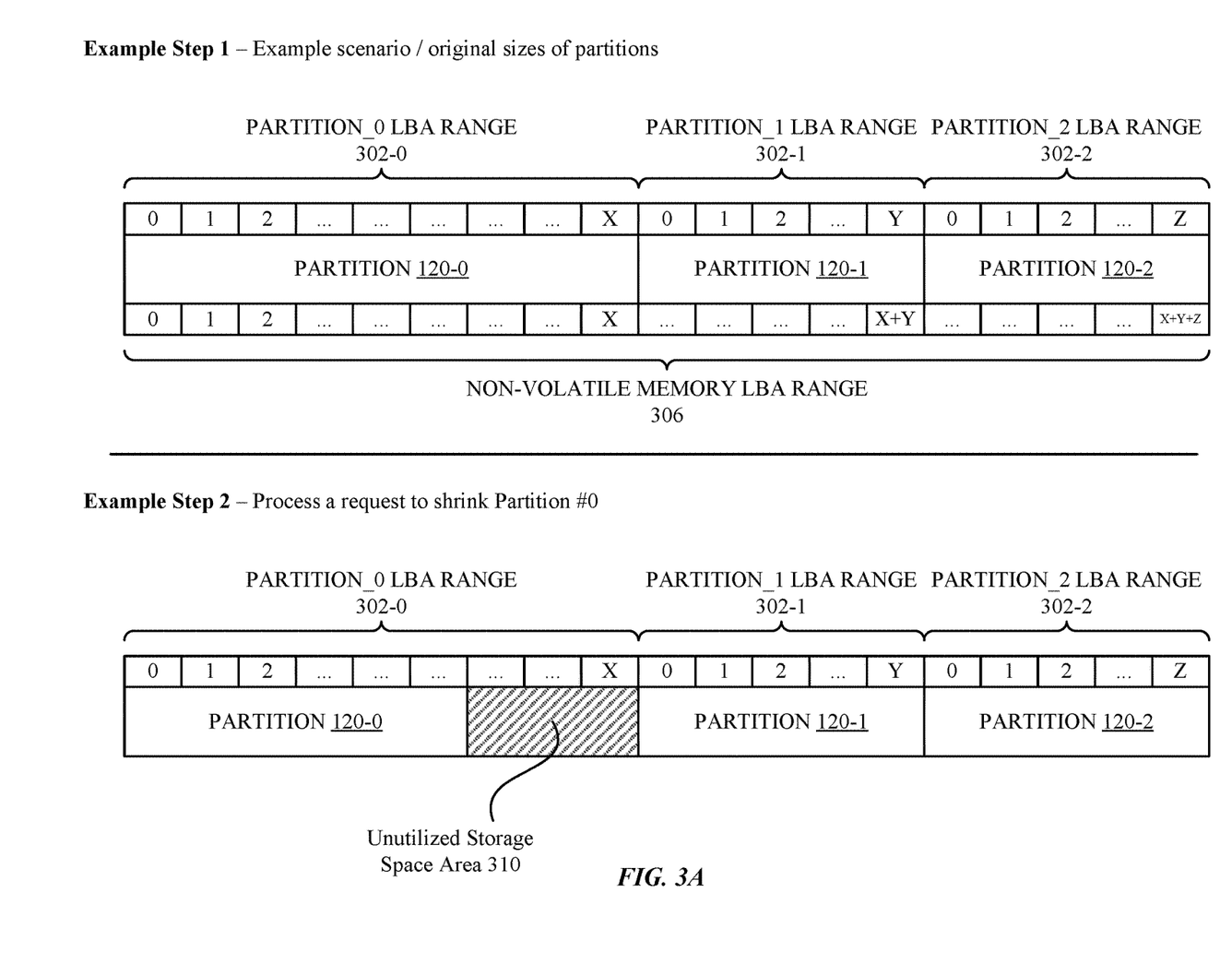
FIGS. 3A-3D provide conceptual diagrams of example scenarios in which different partitions are resized, according to some embodiments.

FIGS. 3A-3D provide conceptual diagrams of example scenarios in which different partitions 120 are resized, according to some embodiments. As shown in FIG. 3A, a first example step provides a foundational state on which various partition 120 resizing operations (described below) can be performed. For example, as shown in FIG. 3A, the non-volatile memory 116 of the storage device 112 can include a partition 120-0, a partition 120-1, and a partition 120-2. As shown in FIG. 3A, each of the foregoing partitions 120 can be associated with a corresponding partition LBA range 302 that is a subset of a complete LBA range 306 associated with the non-volatile memory 116. For example, the partition 120-0 is associated with a partition LBA range 302-0 that includes a total of "X" LBAs. Moreover, the partition 120-1 is associated with a partition LBA range 302-1 that includes a total of "Y" LBAs. Additionally, the partition 120-2 is associated with a partition LBA range 302-2 that includes a total of "Z" LBAs. In this regard, the total number of LBAs in the non-volatile memory LBA range 306 is X+Y+Z (assuming the three partitions 120 consume all available LBAs), where X is less than Y+Z, and Y is less than Z. Accordingly, the first example step sets forth initial maximum sizes for each of the partitions 120 illustrated in FIG. 3A, which, as described in greater detail below, serve as an effective boundary that enables resize operations to be carried out in an efficient manner.

Accordingly, a second example step in FIG. 3A involves receiving a first shrink request to reduce the size of the partition 120-0. The first shrink request can be generated, for example, by way of a partition manager executing on the computing device 102. As illustrated in FIG. 3A, processing the first shrink request can involve establishing an unutilized storage space area 310 that is commensurate with the amount of space by which the partition 120-0 is to be reduced. Although not illustrated in FIG. 3A, processing the first shrink request can involve updating the partition information 118—as well as the metadata 122 associated with the partition 120-0—to reflect the unutilized storage space area 310/reduced size of the partition 120-0. Additionally, processing the first shrink request can involve executing trim operations against the LBAs (within the partition LBA range 302-0) that correspond to the unutilized storage space area 310. In particular, the trim operations can cause the data stored in the unutilized storage space area 310 to be zeroed-out/marked as unutilized. Additionally, the indirection band 126 associated with the partition 120-0 can be updated to reflect the trim operations. Notably, and as previously described herein, each first-tier entry of the indirection band 126 can be encoded to represent that the various sectors that correspond to the first-tier entry are contiguous such that no second-tier entries are required. In this regard, only a relatively small amount of information is required to represent the unutilized storage space area 310 via first-tier entries, as each first-tier entry can represent a large number (e.g., two-hundred fifty-six (256)) of the LBAs in the partition LBA range 302-0 that correspond to the unutilized storage space area 310.

Additionally, it is noted that the various techniques described herein can effectively eliminate the need to relocate data in conjunction with processing the first shrink request. For example, as illustrated in FIG. 3A, any data stored outside of the unutilized storage space area 310-0—including data stored in the partition 120-0, the partition 120-1, and the partition 120-2—can remain in-place without affecting the results of the first shrink request. In this regard, the overall efficiency of the partition 120 resizing techniques described herein is further-improved. However, it is noted that when existing data is stored within the unutilized storage space area 310 (i.e., prior to carrying out the first shrink request), the resizing operation can involve relocating the data into free areas of the partition 120-0 (if any). In turn, the indirection band 126 can be updated to reflect the relocation of the data into the free areas of the partition 120-0.

Figure 3B:
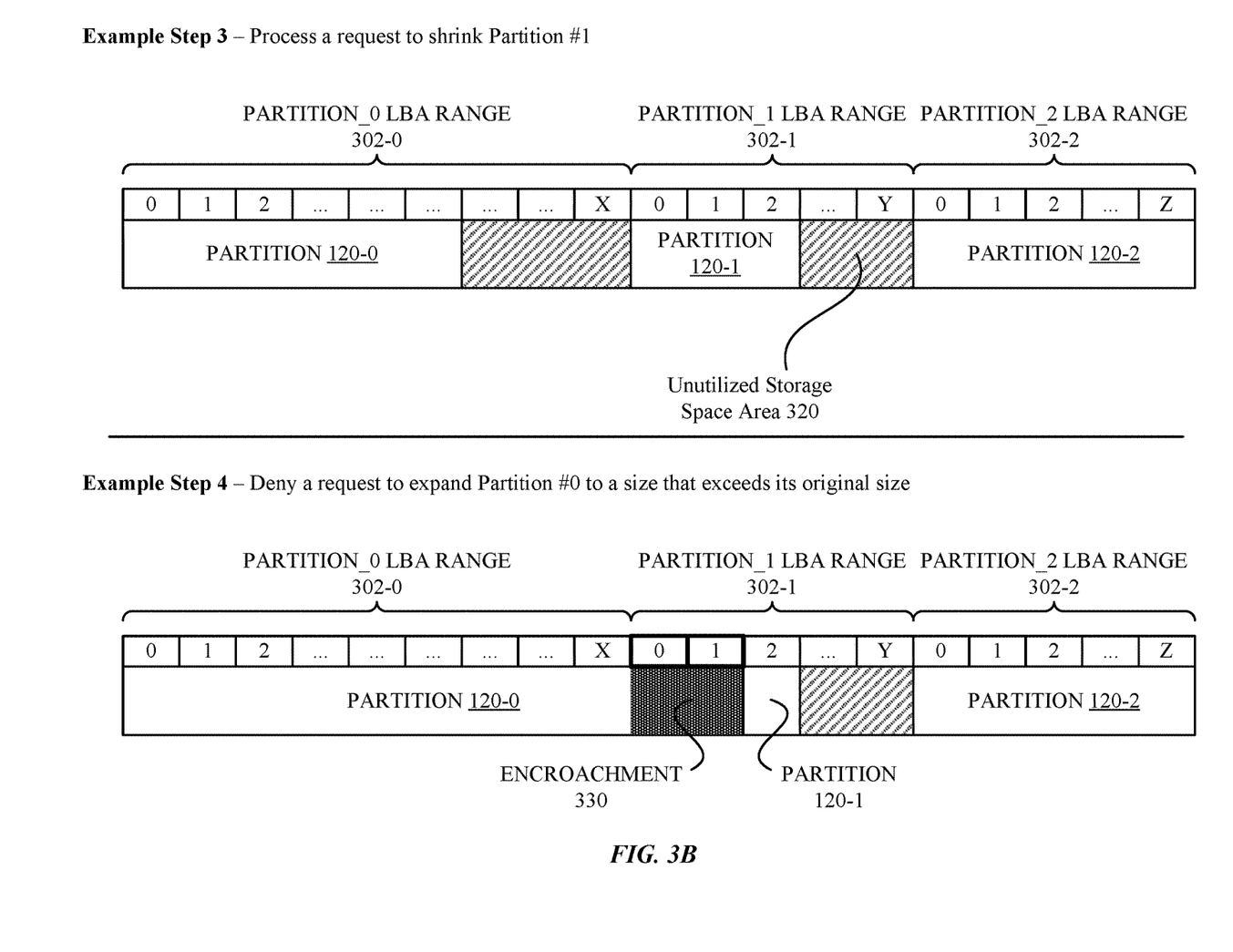

To provide additional understanding of the techniques described herein, FIG. 3B illustrates a third example step that involves reducing the size of the partition 120-1 in response to receiving a second shrink request. In particular, and as illustrated in FIG. 3B, the second shrink request can involve establishing an unutilized storage space area 320 that is commensurate with the amount of space by which the partition 120-1 is to be reduced. In accordance with the techniques previously described herein, processing the second shrink request can involve updating the partition information 118—as well as the metadata 122 associated with the partition 120-1—to reflect the unutilized storage space area 320/the reduced size of the partition 120-1. Additionally, effectively processing the second shrink request can involve executing trim operations against the LBAs (within the partition LBA range 302-1) that correspond to the unutilized storage space area 320. Moreover, the indirection band 126 associated with the partition 120-0 can be updated to reflect the trim operations.

Additionally, to provide further understanding of the techniques described herein, FIG. 3B also illustrates a fourth example step that involves receiving a first expansion request to increase the current size of the partition 120-0 to a size that exceeds the original size of the partition 120-0 (e.g., the original size set forth in the first example step of FIG. 3A). In particular, and as illustrated in FIG. 3B, the first expansion request would otherwise cause an encroachment 330 to take place relative to the partition 120-1, which is unacceptable and violates the resizing requirements described herein. Accordingly, the first expansion request can be denied such that the current size of the partition 120-0 remains intact. According to some embodiments, the denial of the first expansion request can be accompanied with a notification that the original size of the partition 120-0 would be exceeded, and that the partition 120-0 can only be expanded up to the original size.

Figure 3C:
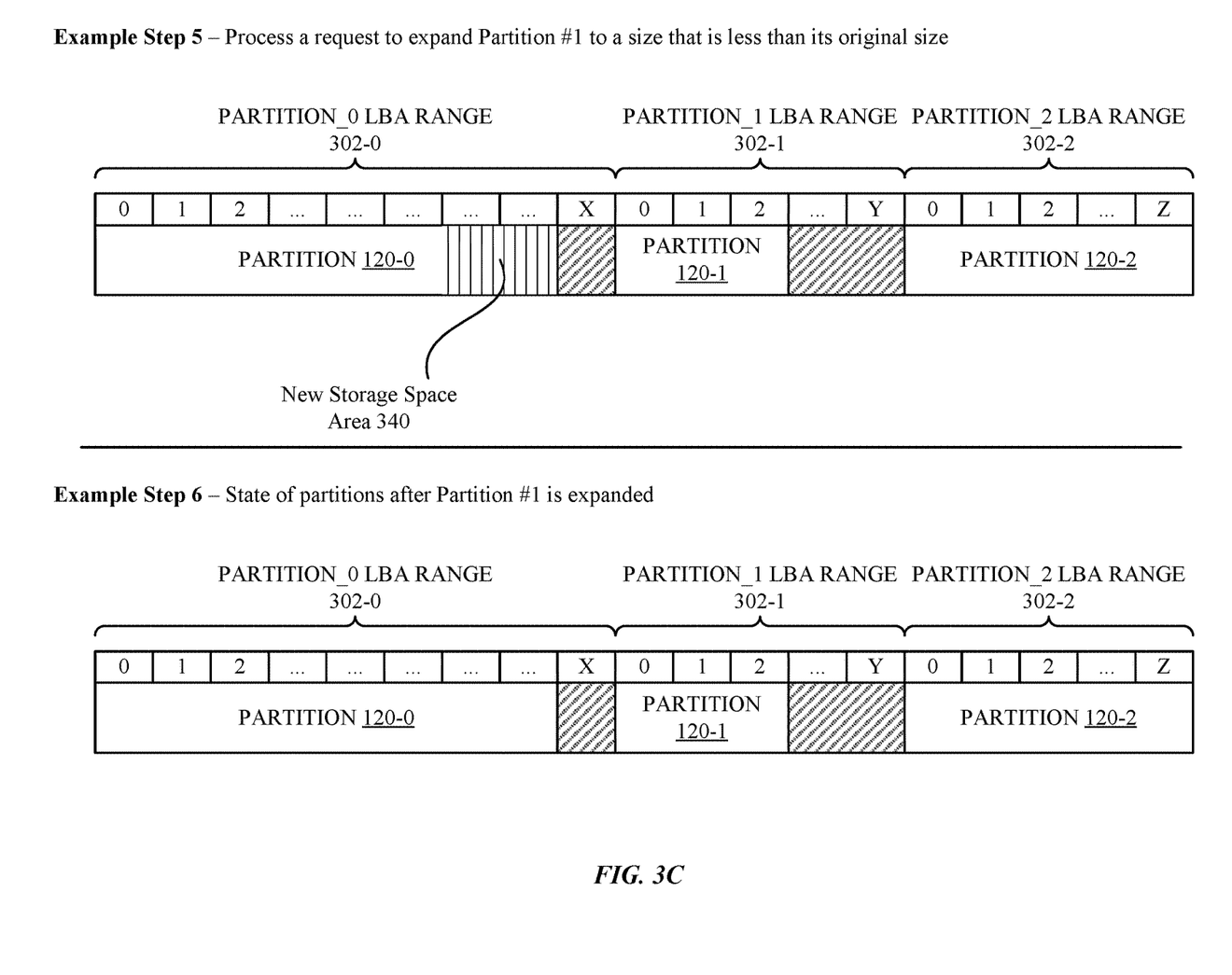

Accordingly, FIG. 3C illustrates a fifth example step that involves a follow-up second expansion request (relative to the first expansion request) to expand the partition 120-0 to a size that is less than the original size of the partition 120-0 (e.g., the original size set forth in the first example step of FIG. 3A). Accordingly, as the second expansion request satisfies the resizing requirements described herein, the second expansion request can be carried out. In particular, and as illustrated in FIG. 3C, the second expansion request can involve establishing a new storage space area 340 that is commensurate with the amount of storage space by which the partition 120-0 is to be increased. In accordance with the techniques previously described herein, processing the second expansion request can involve updating the partition information 118—as well as the metadata 122 associated with the partition 120-1—to reflect the increased size of the partition 120-1. Additionally, effectively processing the second expansion request can involve executing write operations against the LBAs (within the partition LBA range 302-0) that correspond to the new storage space area 340. Moreover, the indirection band 126 associated with the partition 120-0 can be updated to reflect the write operations.

Notably, given the new storage space area 340 does not store actual data—at least in conjunction with the time at which it is formed—the compression-related techniques described herein can be also be achieved. In particular, each first-tier entry of the indirection band 126 can be encoded to represent that all of the sectors (within the non-volatile memory 116) that correspond to the first-tier entry are contiguous such that no second-tier entries are required. In this regard, only a relatively small amount of information is required to represent the new storage space area 340 via first-tier entries, as each first-tier entry can represent a large number (e.g., two-hundred fifty-six (256)) of the LBAs in the partition LBA range 302-0 that correspond to the new storage space area 340. Accordingly, at the conclusion of the fifth example, the partition 120-0 and the partition 120-1 are sized differently relative to their original sizes (as established at the first step of FIG. 3A), and each remain associated with unutilized areas of the non-volatile memory 116 (as shown in the sixth example step in FIG. 3C).

Figure 3D:
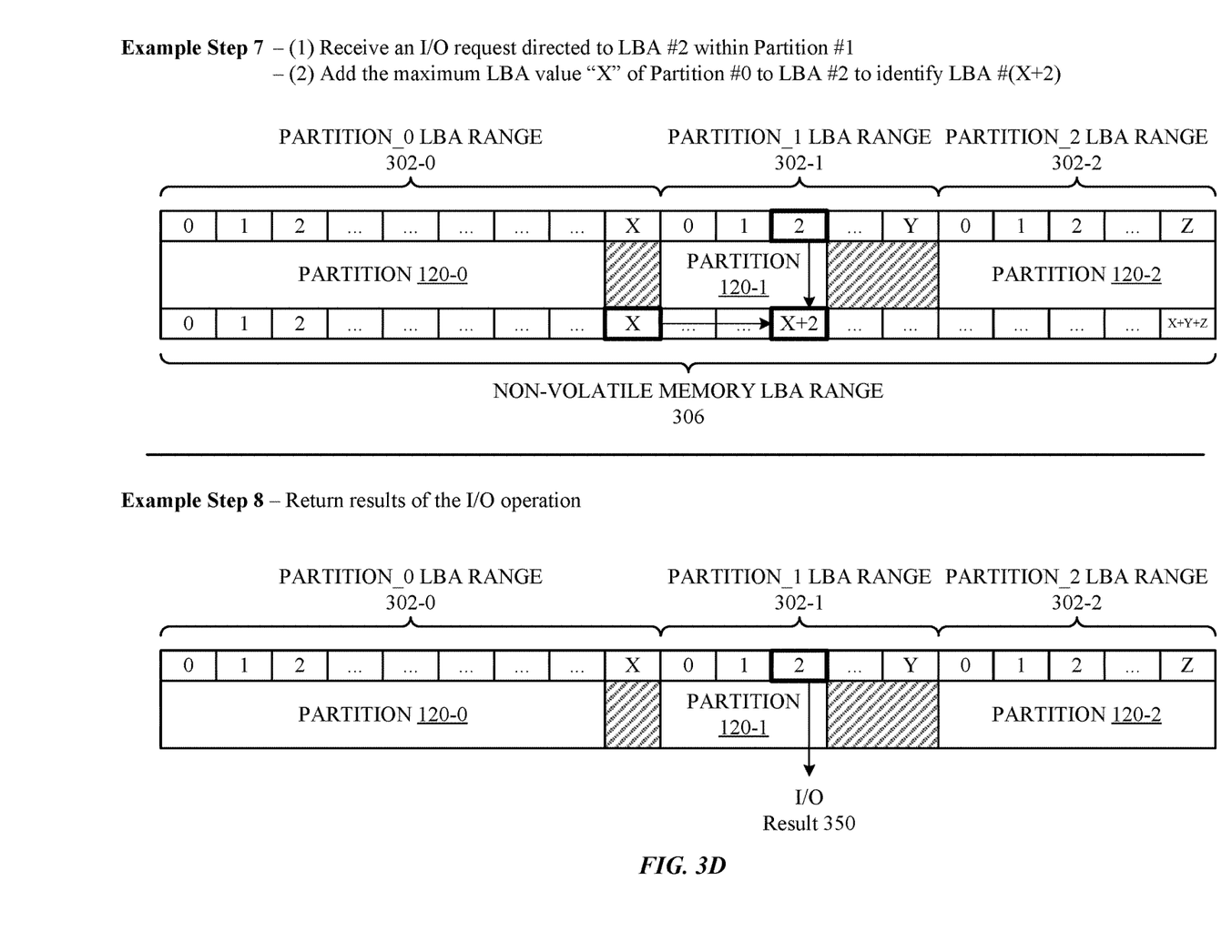

To provide additional understanding of the techniques described herein, FIG. 3D illustrates additional steps that involve processing I/O requests in accordance with the sizes / layout of the partitions 120-0, 120-1, and 120-2. For example, a seventh example step illustrated in FIG. 3D involves receiving an I/O request directed to the second LBA within the partition 120-1. Importantly, given the starting LBA of the partition 120-1 is offset from the non-volatile memory LBA range 306 by a value of "X" LBAs—i.e., the number of LBAs included in the partition LBA range 302-0—the value of "X" should be added to the LBA referenced in the I/O request so that the appropriate area of the non-volatile memory 116 is properly referenced. Accordingly, as shown in FIG. 3D, the maximum LBA value "X" of the partition 120-0 is added to the LBA value referenced in the I/O request to produce an LBA value "X+2". In turn, the I/O operation is processed, and at example step eight, a result 350 for the I/O operation is returned.

Additionally, it is noted that any LBA information included in the result 350 can be updated in accordance with the LBA referenced in the I/O request so that the indirection techniques described herein are not exposed to the entity that issued the I/O request (e.g., an application 110). For example, if the LBA #(X+2) cannot be read, it would be inappropriate to indicate the LBA #(X+2) in the result, as the application 110 is not privy to the offsets described herein. Accordingly, to cure this deficiency, the LBA information in included in the result 350 can be updated to reflect the original LBA values. According to some embodiments, the original LBA values can be temporarily stored (e.g., in a buffer) while the I/O operation is processed so that they do not need to be recalculated when providing the result 350. Alternatively, the original LBA values can be recalculated/ restored on-the-fly and in accordance with the offset amounts that are applied in conjunction with receiving the I/O request.

Accordingly, FIGS. 3A-3D provide conceptual diagrams of example scenarios in which the various techniques described herein can be utilized to improve the overall operational efficiency of the computing device 102. To provide further context, FIGS. 4A-4C illustrate method diagrams that can be carried out to implement the various techniques described herein, which will now be described below in greater detail.

Figure 4A:
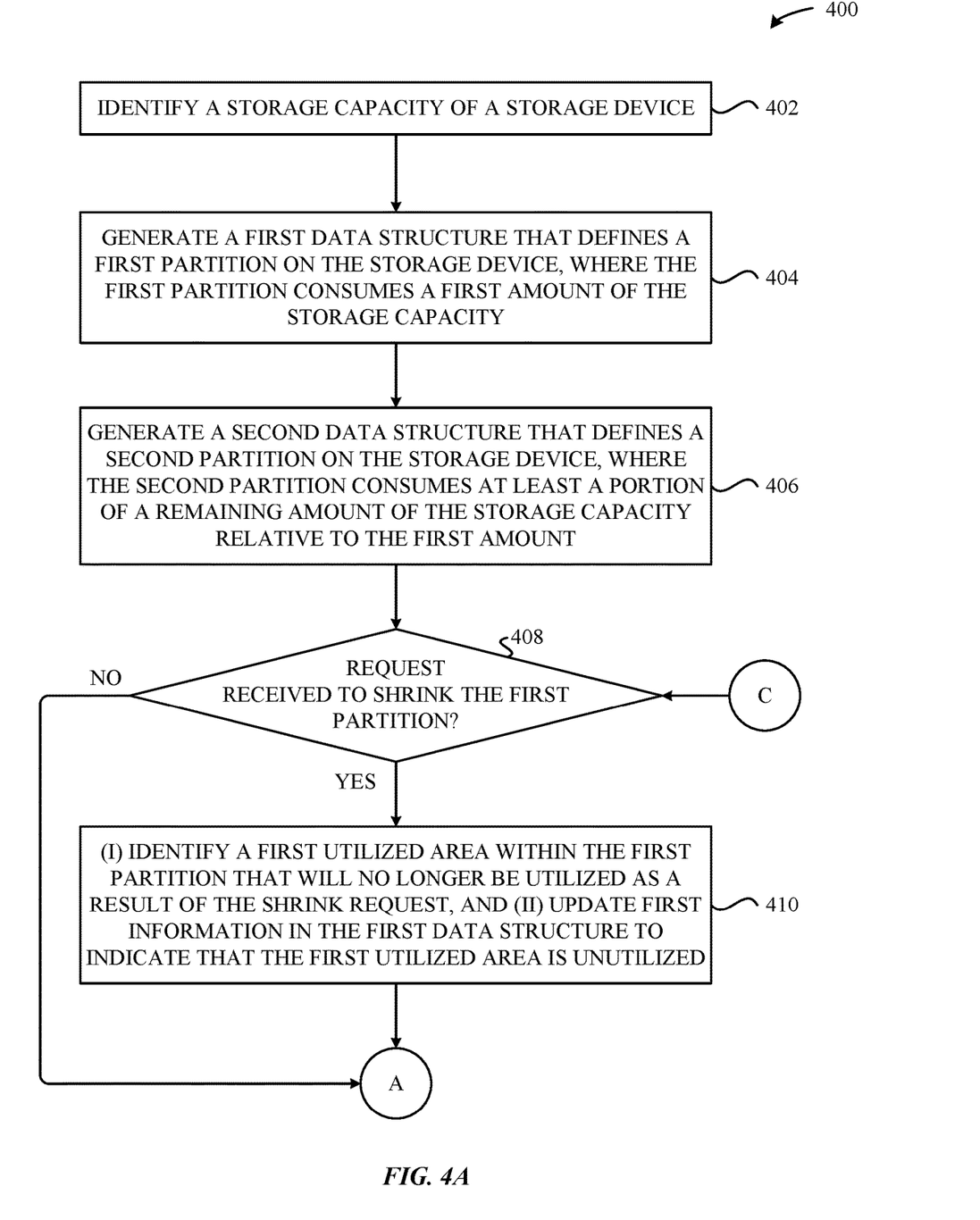
FIGS. 4A-4C illustrate a method for managing different partitions on a storage device, according to some embodiments.
Figure 4B:
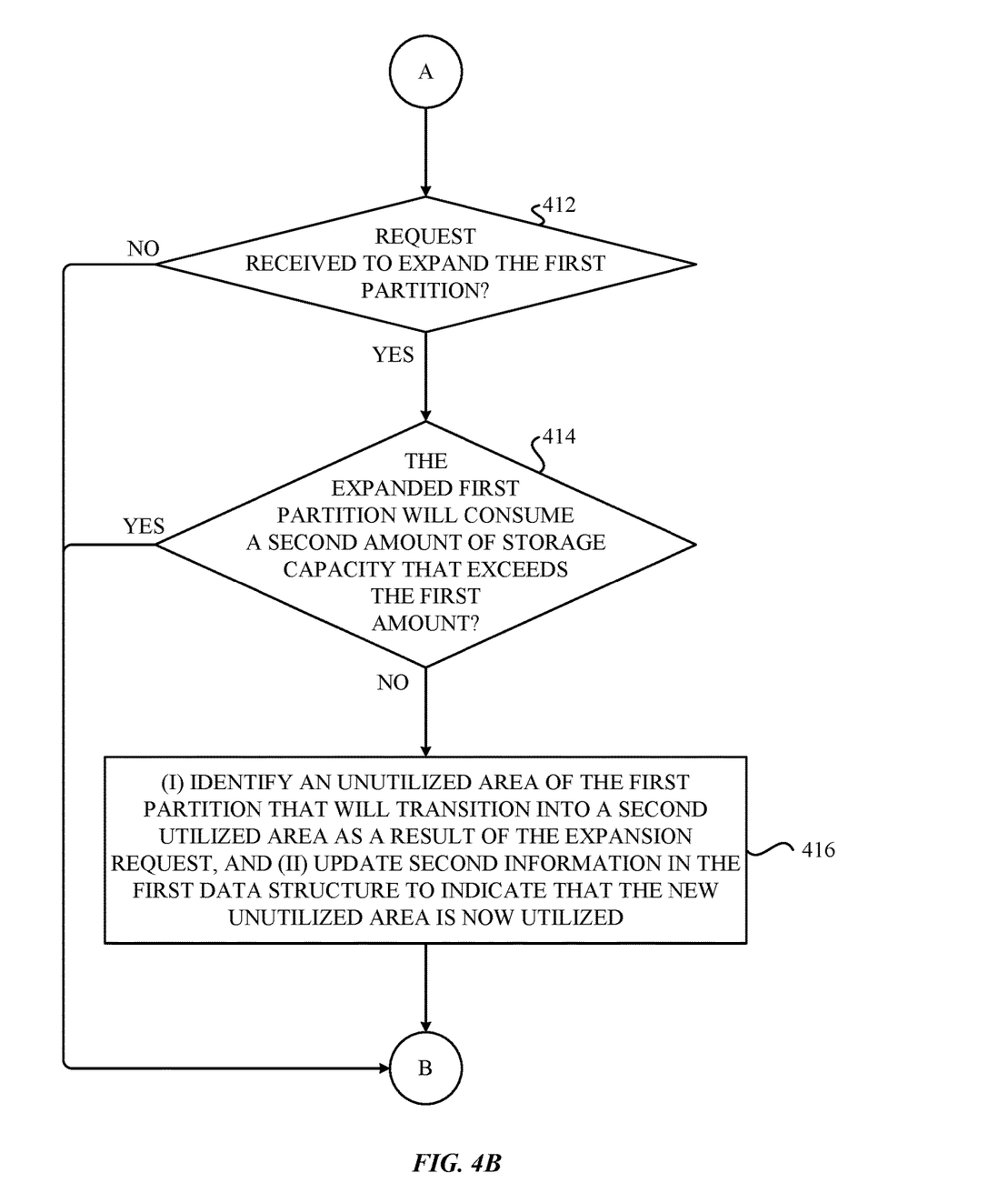
Figure 4C:
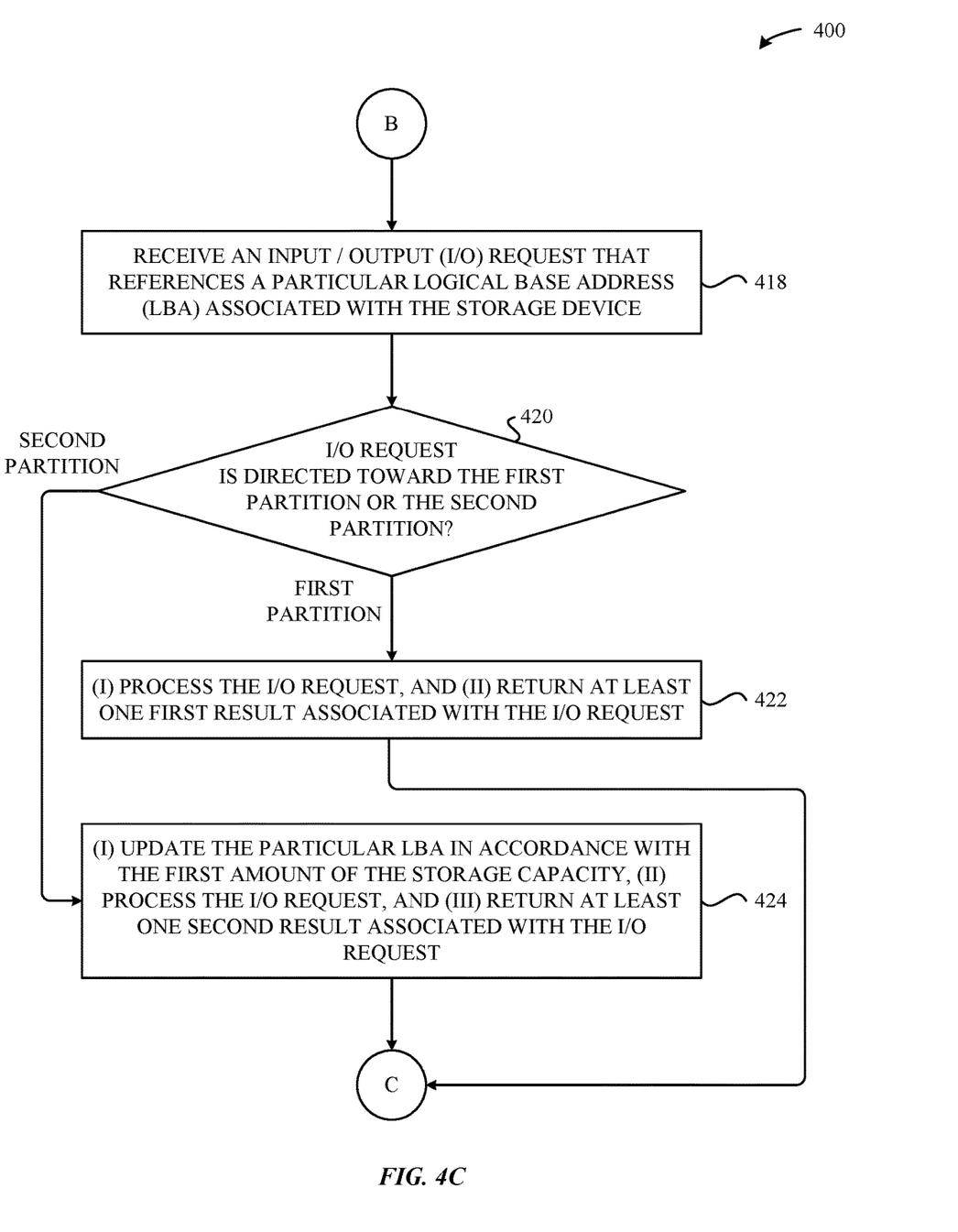

FIGS. 4A-4C illustrate a method 400 for managing different partitions 120 on the storage device 112, according to some embodiments. As shown in FIG. 4A, the method 400 begins at step 402, where the controller 114 identifies a storage capacity of a storage device. Step 402 can occur, for example, during an initial setup of the computing device 102, e.g., in conjunction with loading an OS/recovery module into the storage device 112 of the computing device 102. At step 404, the controller 114 generates a first data structure that defines a first partition on the storage device, where the first partition consumes a first amount of the storage capacity. At step 406, the controller 114 generates a second data structure that defines a second partition on the storage device, where the second partition consumes at least a portion of a remaining amount of the storage capacity relative to the first amount. It is noted, however, that additional partitions can be added, such that all or a remaining amount of the storage capacity is provided to the additional partitions (e.g., as described above in conjunction with FIG. 3A).

At step 408, the controller 114 determines whether a request is received to shrink the first partition (e.g., as described above in conjunction with FIGS. 3A-3B). If, at step 408, the controller 114 determines that a request is received to shrink the first partition, then the method 400 proceeds to step 410. Otherwise, the method 400 proceeds to step 412, which is described below in greater detail in conjunction with FIG. 4B. At step 410, the controller 114 (i) identifies a first utilized area within the first partition that will no longer be utilized as a result of the shrink request, and (ii) updates first information in the first data structure to indicate that the first utilized area is unutilized (e.g., as described above in conjunction with FIGS. 3A-3B).

Turning now to FIG. 4B, at step 412, the controller 114 determines whether a request is received to expand the first partition (e.g., as described above in conjunction with FIG. 3C). If, at step 412, the controller 114 determines that a request is received to expand the first partition, then the method 400 proceeds to step 414. Otherwise, the method 400 proceeds to step 418, which is described below in greater detail. At step 414, the controller 114 determines whether the expanded first partition will consume a second amount of storage capacity that exceeds the first amount (e.g., as described above in conjunction with FIG. 3C). If, at step 414, the controller 114 determines that the expanded first partition will consume a second amount of storage capacity that exceeds the first amount, then the method 400 proceeds to step 418, which is described below in greater detail. Otherwise, the method 400 proceeds to step 416, where the controller 114 (i) identifies an unutilized area of the first partition that will transition into a second utilized area as a result of the expansion request, and (ii) updates second information in the first data structure to indicate that the new unutilized area is now utilized (e.g., as described above in conjunction with FIG. 3C).

At step 418, the controller 114 receives an I/O request that references a particular logical base address (LBA) associated with the storage device (e.g., as described above in conjunction with FIG. 3D). For example, the I/O request can involve writing, modifying, or removing data from the data band 128 within the non-volatile memory 116. It is noted that the foregoing examples are not meant to be limiting, and that any form of I/O operation(s) can be directed toward the non-volatile memory 116 of the storage device 112. At step 420, the controller 114 determines whether the I/O request is directed toward the first partition or the second partition. If, at step 420, the controller 114 determines that the I/O request is directed toward the first partition (and no LBA offset adjustment is required), then the method 400 proceeds to step 422, where the controller 114 (i) processes the I/O request, and (ii) returns at least one first result associated with the I/O request. Alternatively, if, at step 420, the controller 114 determines that I/O request is directed toward the second partition (and an LBA offset adjustment is required), then the method 400 proceeds to step 424, where the controller 114 (i) updates the particular LBA in accordance with the first amount of the storage capacity, (ii) processes the I/O request, and (iii) returns at least one second result associated with the i/o request (e.g., as described above in conjunction with FIG. 3D).

It is noted that this disclosure primarily involves the controller 114 carrying out the various techniques described herein for the purpose of unified language and simplification. However, it is noted that other entities can be configured to carry out these techniques without departing from this disclosure. For example, other software components (e.g., the OS 108, applications 110, firmware(s), etc.) executing on the computing device 102 can be configured to carry out all or a portion of the techniques described herein without departing from the scope of this disclosure. Moreover, other hardware components included in the computing device 102 can be configured to carry out all or a portion of the techniques described herein without departing from the scope of this disclosure. Further, all or a portion of the techniques described herein can be offloaded to another computing device without departing from the scope of this disclosure.

Figure 5:
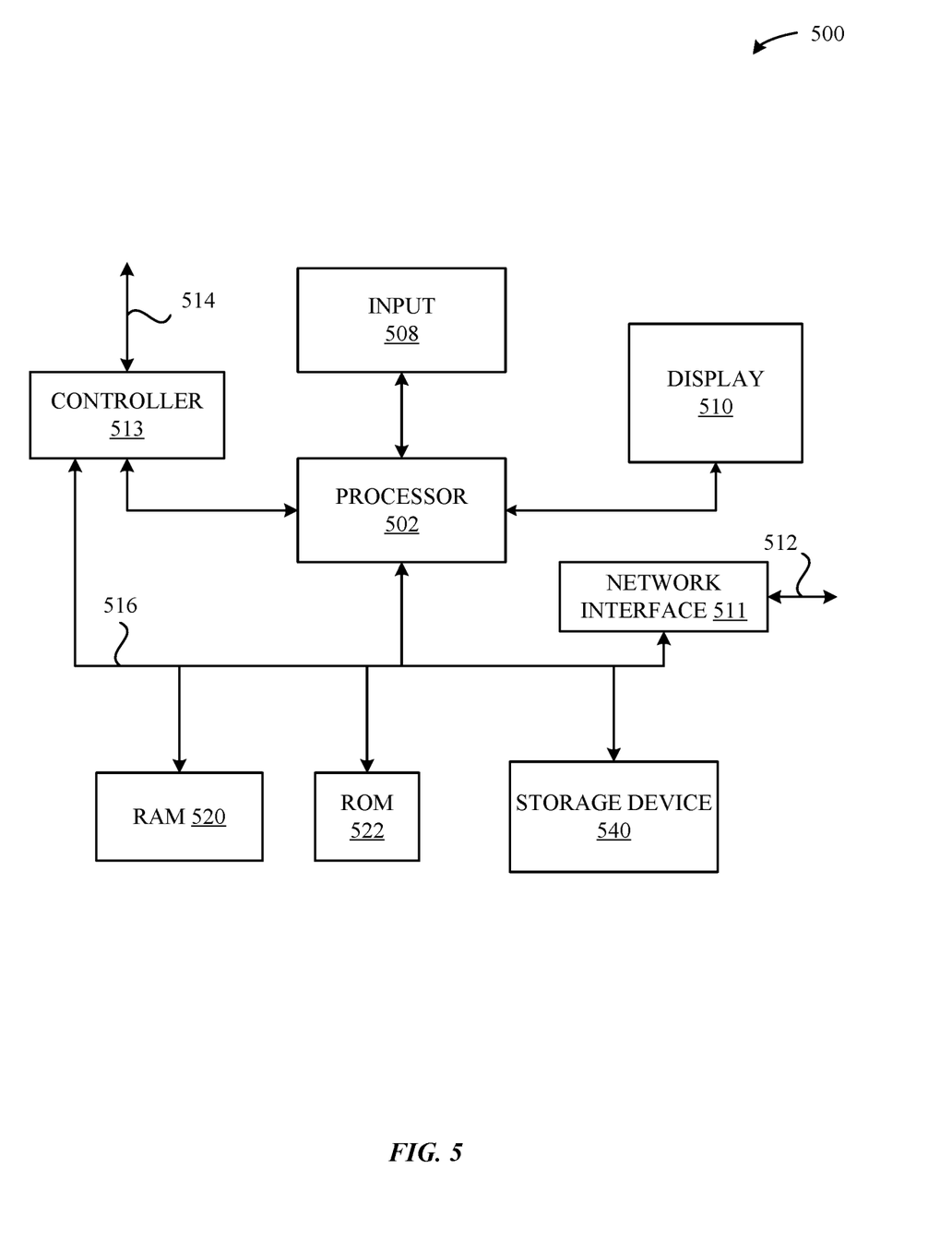
FIG. 5 illustrates a detailed view of a computing device that can be used to implement the various components described herein, according to some embodiments.

FIG. 5 illustrates a detailed view of a computing device 500 that can be used to implement the various components described herein, according to some embodiments. In particular, the detailed view illustrates various components that can be included in the computing device 102 illustrated in FIG. 1. As shown in FIG. 5, the computing device 500 can include a processor 502 that represents a microprocessor or controller for controlling the overall operation of computing device 500. The computing device 500 can also include a user input device 508 that allows a user of the computing device 500 to interact with the computing device 500. For example, the user input device 508 can take a variety of forms, such as a button, keypad, dial, touch screen, audio input interface, visual/image capture input interface, input in the form of sensor data, etc. Still further, the computing device 500 can include a display 510 (screen display) that can be controlled by the processor 502 to display information to the user. A data bus 516 can facilitate data transfer between at least a storage device 540, the processor 502, and a controller 513. The controller 513 can be used to interface with and control different equipment through and equipment control bus 514. The computing device 500 can also include a network/bus interface 511 that couples to a data link 512. In the case of a wireless connection, the network/bus interface 511 can include a wireless transceiver.

The computing device 500 also includes a storage device 540, which can comprise a single disk or a plurality of disks (e.g., SSDs), and includes a storage management module that manages one or more partitions within the storage device 540. In some embodiments, storage device 540 can include flash memory, semiconductor (solid state) memory or the like. The computing device 500 can also include a Random-Access Memory (RAM) 520 and a Read-Only Memory (ROM) 522. The ROM 522 can store programs, utilities or processes to be executed in a non-volatile manner. The RAM 520 can provide volatile data storage, and stores instructions related to the operation of the computing device 102.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

What is claimed is:

1. A method for managing partitions on a storage device, the method comprising, at a computing device that is communicably coupled with the storage device:
   managing (1) a first data structure that defines a first partition on the storage device, wherein the first partition spans a first amount of a storage capacity of the storage device and is associated with a pre-defined maximum partition size, and (2) a second data structure that defines a second partition on the storage device, wherein the second partition spans at least a portion of a remaining amount of the storage capacity relative to the first amount;
   in response to receiving a shrink request directed to the first partition to cause the first amount to be less than the pre-defined maximum partition size of the first partition:
      identifying a first utilized area within the first partition that will no longer be utilized as a result of the shrink request, and
      updating first information in the first data structure to establish an indication that the first utilized area is unutilized;
   receiving an expansion request directed to the first partition; and
   in response to determining that the expansion request will not cause the first partition to consume a second amount of storage capacity that exceeds the first amount:
      identifying an unutilized area of the first partition that will transition into a second utilized area as a result of the expansion request, and
      updating second information in the first data structure to indicate that the unutilized area is now utilized.

2. The method of claim 1, further comprising, in response to determining that the expansion request will cause the first partition to consume the second amount of storage capacity that exceeds the first amount:
   generating a notification that the expansion request is denied.

3. The method of claim 1, wherein:
   updating the first information comprises issuing at least one trim command, and
   updating the second information comprises issuing at least one write command.

4. The method of claim 1, further comprising:
   receiving an input/output (I/O) request that references a particular logical base address (LBA) associated with the storage device;
   in response to identifying that the I/O request is directed to the first partition:
      processing the I/O request, and
      returning at least one first result associated with the I/O request; and
   in response to identifying that the I/O request is directed to the second partition:
      updating the particular LBA in accordance with the first amount of the storage capacity,
      processing the I/O request, and
      returning at least one second result associated with the I/O request.

5. The method of claim 4, further comprising, prior to returning the at least one second result associated with the I/O request:
   updating the at least one second result to reference the particular LBA referenced in the I/O request.

6. The method of claim 1, wherein the first partition is associated with a first file format, and the second partition is associated with a second file format that is distinct from the first file format.

7. The method of claim 1, wherein the first and second data structures include, at most, two levels of hierarchy.

8. At least one non-transitory computer readable storage medium configured to store instructions that, when executed by at least one processor included in a computing device, cause the computing device to manage partitions on a storage device that is communicably coupled to the computing device, by carrying out steps that include:
   managing (1) a first data structure that defines a first partition on the storage device, wherein the first partition spans a first amount of a storage capacity of the storage device and is associated with a pre-defined maximum partition size, and (2) a second data structure that defines a second partition on the storage device, wherein the second partition spans at least a portion of a remaining amount of the storage capacity relative to the first amount;
   in response to receiving a shrink request directed to the first partition to cause the first amount to be less than the pre-defined maximum partition size of the first partition:
      identifying a first utilized area within the first partition that will no longer be utilized as a result of the shrink request, and
      updating first information in the first data structure to establish an indication that the first utilized area is unutilized;
   receiving an expansion request directed to the first partition; and
   in response to determining that the expansion request will not cause the first partition to consume a second amount of storage capacity that exceeds the first amount:
      identifying an unutilized area of the first partition that will transition into a second utilized area as a result of the expansion request, and
      updating second information in the first data structure to indicate that the unutilized area is now utilized.

9. The at least one non-transitory computer readable storage medium of claim 8, wherein the steps further include, in response to determining that the expansion request will cause the first partition to consume the second amount of storage capacity that exceeds the first amount:
   generating a notification that the expansion request is denied.

10. The at least one non-transitory computer readable storage medium of claim 8, wherein:
   updating the first information comprises issuing at least one trim command, and updating the second information comprises issuing at least one write command.

11. The at least one non-transitory computer readable storage medium of claim 8, wherein the steps further include:
receiving an input/output (I/O) request that references a particular logical base address (LBA) associated with the storage device;
in response to identifying that the I/O request is directed to the first partition:
processing the I/O request, and
returning at least one first result associated with the I/O request; and
in response to identifying that the I/O request is directed to the second partition:
updating the particular LBA in accordance with the first amount of the storage capacity,
processing the I/O request, and
returning at least one second result associated with the I/O request.

12. The at least one non-transitory computer readable storage medium of claim 11, wherein the steps further include, prior to returning the at least one second result associated with the I/O request:
updating the at least one second result to reference the particular LBA referenced in the I/O request.

13. The at least one non-transitory computer readable storage medium of claim 8, wherein the first partition is associated with a first file format, and the second partition is associated with a second file format that is distinct from the first file format.

14. The at least one non-transitory computer readable storage medium of claim 8, wherein the first and second data structures include, at most, two levels of hierarchy.

15. A computing device configured to manage partitions on a storage device, the computing device comprising:
at least one processor;
and at least one memory storing instructions that, when executed by the at least one processor, cause the computing device to carry out steps that include:
managing (1) a first data structure that defines a first partition on the storage device, wherein the first partition spans a first amount of a storage capacity of the storage device and is associated with a pre-defined maximum partition size, and (2) a second data structure that defines a second partition on the storage device, wherein the second partition spans at least a portion of a remaining amount of the storage capacity relative to the first amount;
in response to receiving a shrink request directed to the first partition to cause the first amount to be less than the pre-defined maximum partition size of the first partition:
identifying a first utilized area within the first partition that will no longer be utilized as a result of the shrink request, and
updating first information in the first data structure to establish an indication that the first utilized area is unutilized;
receiving an expansion request directed to the first partition; and
in response to determining that the expansion request will not cause the first partition to consume a second amount of storage capacity that exceeds the first amount:
identifying an unutilized area of the first partition that will transition into a second utilized area as a result of the expansion request, and
updating second information in the first data structure to indicate that the unutilized area is now utilized.

16. The computing device of claim 15, wherein the at least one processor further causes the computing device to, in response to determining that the expansion request will cause the first partition to consume the second amount of storage capacity that exceeds the first amount:
generate a notification that the expansion request is denied.

17. The computing device of claim 15, wherein:
updating the first information comprises issuing at least one trim command, and
updating the second information comprises issuing at least one write command.

18. The computing device of claim 15, wherein the at least one processor further causes the computing device to:
receive an input/output (I/O) request that references a particular logical base address (LBA) associated with the storage device;
in response to identifying that the I/O request is directed to the first partition:
process the I/O request, and
return at least one first result associated with the I/O request; and
in response to identifying that the I/O request is directed to the second partition:
update the particular LBA in accordance with the first amount of the storage capacity,
process the I/O request, and
return at least one second result associated with the I/O request.

19. The computing device of claim 18, wherein the at least one processor further causes the computing device to, prior to returning the at least one second result associated with the I/O request:
update the at least one second result to reference the particular LBA referenced in the I/O request.

20. The computing device of claim 15, wherein the first partition is associated with a first file format, and the second partition is associated with a second file format that is distinct from the first file format.

* * * * *